United States Patent

Uyama

Patent Number: 5,337,650
Date of Patent: Aug. 16, 1994

[54] BOOSTER FOR BRAKE OR CLUTCH

[75] Inventor: Shintaro Uyama, Saitama, Japan

[73] Assignee: Jidosha Kiki Co., Ltd., Tokyo, Japan

[21] Appl. No.: 80,932

[22] Filed: Jun. 22, 1993

[30] Foreign Application Priority Data

Jul. 10, 1992 [JP] Japan .................. 4-207124

[51] Int. Cl.⁵ .............................. F15B 9/10
[52] U.S. Cl. ................................. 91/376 R
[58] Field of Search .......... 91/369.1, 369.2, 369.3, 91/369.4, 376 R

[56] References Cited

U.S. PATENT DOCUMENTS

| | | | |
|---|---|---|---|
| 3,628,422 | 12/1971 | Acre | 91/369.4 |
| 4,747,336 | 5/1988 | Uyama | 91/376 |
| 4,759,255 | 7/1988 | Shimamura | 91/6 |
| 4,784,038 | 11/1988 | Gautier | 91/376 R |
| 4,862,787 | 9/1989 | Suzuki et al. | 91/369.2 |
| 5,027,695 | 7/1991 | Inoue et al. | 91/369.2 |
| 5,046,398 | 9/1991 | Hamamiya et al. | |
| 5,062,348 | 11/1991 | Gotoh et al. | 91/369.2 |
| 5,083,495 | 1/1992 | Satoh | 91/369.2 |
| 5,111,734 | 5/1992 | Suzuki | 91/376 |
| 5,121,673 | 6/1992 | Araki | 91/369.1 |
| 5,121,674 | 6/1992 | Uyama | 91/369.3 |
| 5,146,837 | 9/1992 | Inoue | 91/369.2 |
| 5,158,006 | 10/1992 | Gotoh et al. | 92/161 |
| 5,170,628 | 12/1992 | Satoh et al. | 60/547.1 |

Primary Examiner—Edward K. Look
Assistant Examiner—F. Daniel Lopez
Attorney, Agent, or Firm—Flynn, Thiel, Boutell & Tanis

[57] ABSTRACT

An improvement of a constant pressure passage formed within a valve body of a brake booster is disclosed. A notch of a given size is formed in the internal peripheral surface of the valve body at a location rearward of the rear end of the constant pressure passage. The provision of the notch allows the diameter of a reaction disc to be increased over the prior art by an amount corresponding to the depth of the notch, thus allowing the durability of the reaction disc to be improved.

4 Claims, 3 Drawing Sheets

BOOSTER FOR BRAKE OR CLUTCH

FIELD OF THE INVENTION

The invention relates to a brake or clutch booster, and more particularly, to an improvement of a constant pressure passage formed in a valve body.

DESCRIPTION OF THE PRIOR ART

A booster is known in the art comprising a substantially tubular valve body, an annular, first step formed on the internal peripheral surface of the valve body and having its end face facing rearward, an annular, second step formed on the internal periphery of the valve body at a location rearward of the location of the first step and having its end face facing rearward, an annular valve seat formed on the inner periphery of the end face of the first step, a constant pressure passage formed in the valve body and having a rear end which opens into the internal peripheral surface of the valve body at a location radially outward of the valve seat, and a valve element which is substantially cylindrical in configuration and having a front end which is formed to define a seat adapted to be seated upon the valve seat and a rear end which is mounted on the second step.

In the conventional booster constructed in the manner mentioned above, the valve body is molded by casting synthetic resin into a given mold. During the molding process, a releasable mold is used to define an axial opening extending parallel to the axis of the valve body in order to define a constant pressure passage. In the conventional booster thus constructed, it necessarily follows that the rear end of the constant pressure passage is located radially outward of the valve seat while the front end of the constant pressure passage opens into the end face of the step on the valve body against which a reaction disc, which is used to transmit a reaction, abuts, with the position of the opening being located outward of, but close to the reaction disc.

Recently, an improvement of the durability of a reaction disc used in a booster is demanded, and there is an attempt to increase the outer diameter of the reaction disc, since the durability of the reaction disc can be improved by increasing the diameter of the reaction disc which in turn allows the internal pressure within the reaction disc to be reduced.

However, when the outer diameter of the reaction disc is chosen greater than the diameter of the inner periphery of the valve body which defines the outer peripheral edge of the first step, the constant pressure passage cannot be formed to extend parallel to the axis of the valve body, but must be formed to extend in an oblique direction. Obviously, this requires a construction in which a releasable mold for forming the constant pressure passage must be withdrawn in the oblique direction, resulting in an increased size of the valve body. In addition, if a construction is employed in which the releasable mold is withdrawn in the oblique direction, there results a disadvantage that the moldability of the valve body is degraded.

SUMMARY OF THE INVENTION

The invention relates to a booster comprising a substantially tubular valve body, an annular, first step formed on the internal peripheral surface of the valve body and having an end face facing rearward, an annular, second step formed around the inner periphery of the valve body at a position rearward of the first step and having an end face facing rearward, an annular valve seat formed on the inner periphery of the end face of the first step, a constant pressure passage formed in the valve body and having a rear end which opens into the internal peripheral surface of the valve body at a location radially outward of the valve seat, and a substantially cylindrical valve seat having a front end which defines a seat adapted to be seated upon the valve seat and having a rear end which is mounted on the second step.

In view of the disadvantage of the prior art mentioned above, in accordance with the invention, a notch is formed in the internal peripheral surface of the valve body which is located rearward of the constant pressure passage.

With the construction of the present invention, the provision of the notch allows the constant pressure passage to be formed to extend parallel to the axis of the valve body. The releasable mold which is used to define the constant pressure passage may be shaped to bulge radially outward by an amount corresponding to the radial size (depth) of the notch, thereby allowing the outer diameter of the reaction disc to be substantially increased by an amount corresponding to the radial depth of the notch. In this manner, the outer diameter of the reaction disc may be increased without increasing the overall size of the valve body, thus improving the durability of the reaction disc.

Above and other objects, features and advantages of the invention will become apparent from the following description of several embodiments thereof with reference to the attached drawings.

DETAILED DESCRIPTION OF EMBODIMENTS

Figure 1:
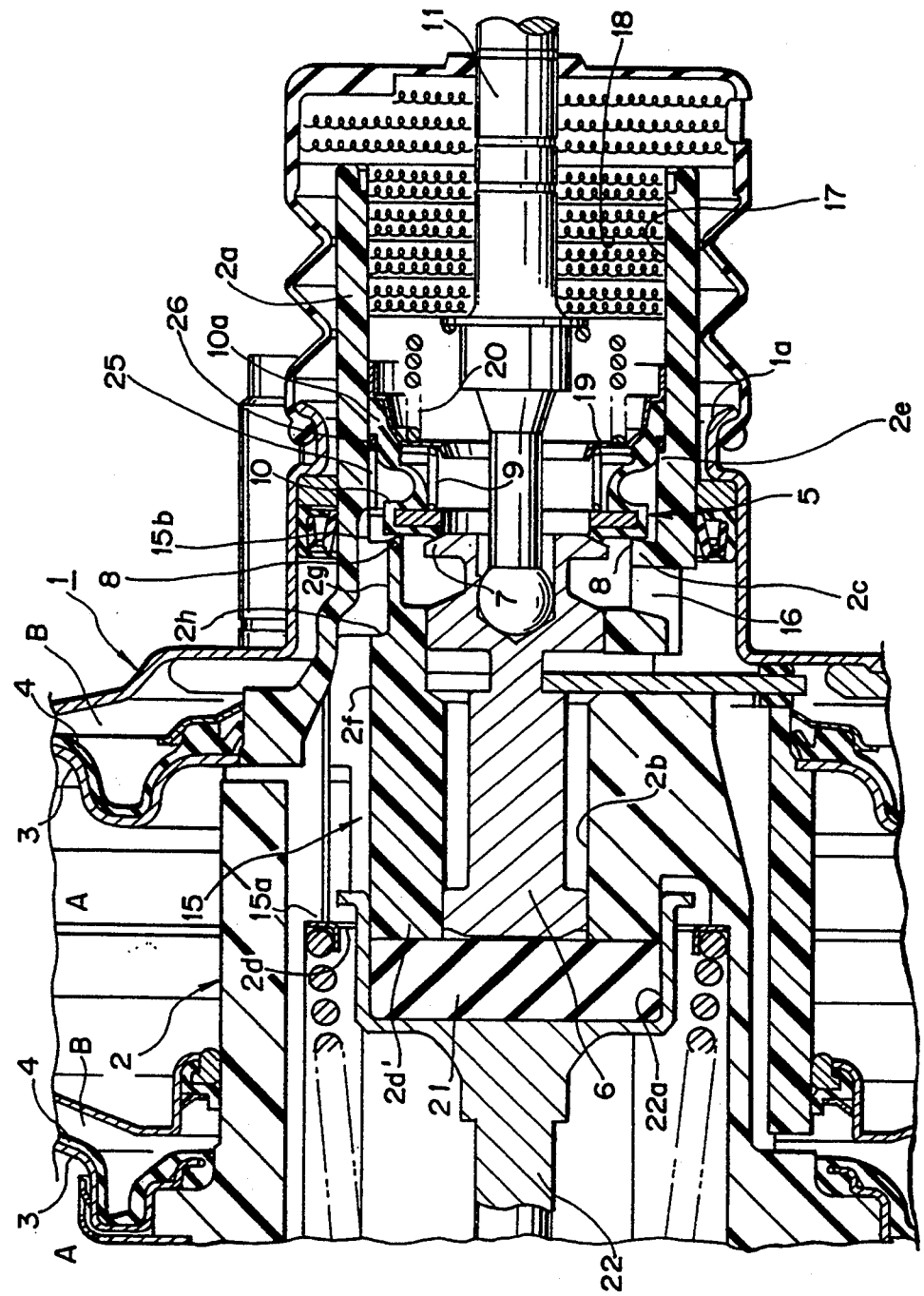
FIG. 1 is a cross section, corresponding to line I—I shown in FIG. 2, of an overall booster according to a first embodiment of the invention.
Figure 2:
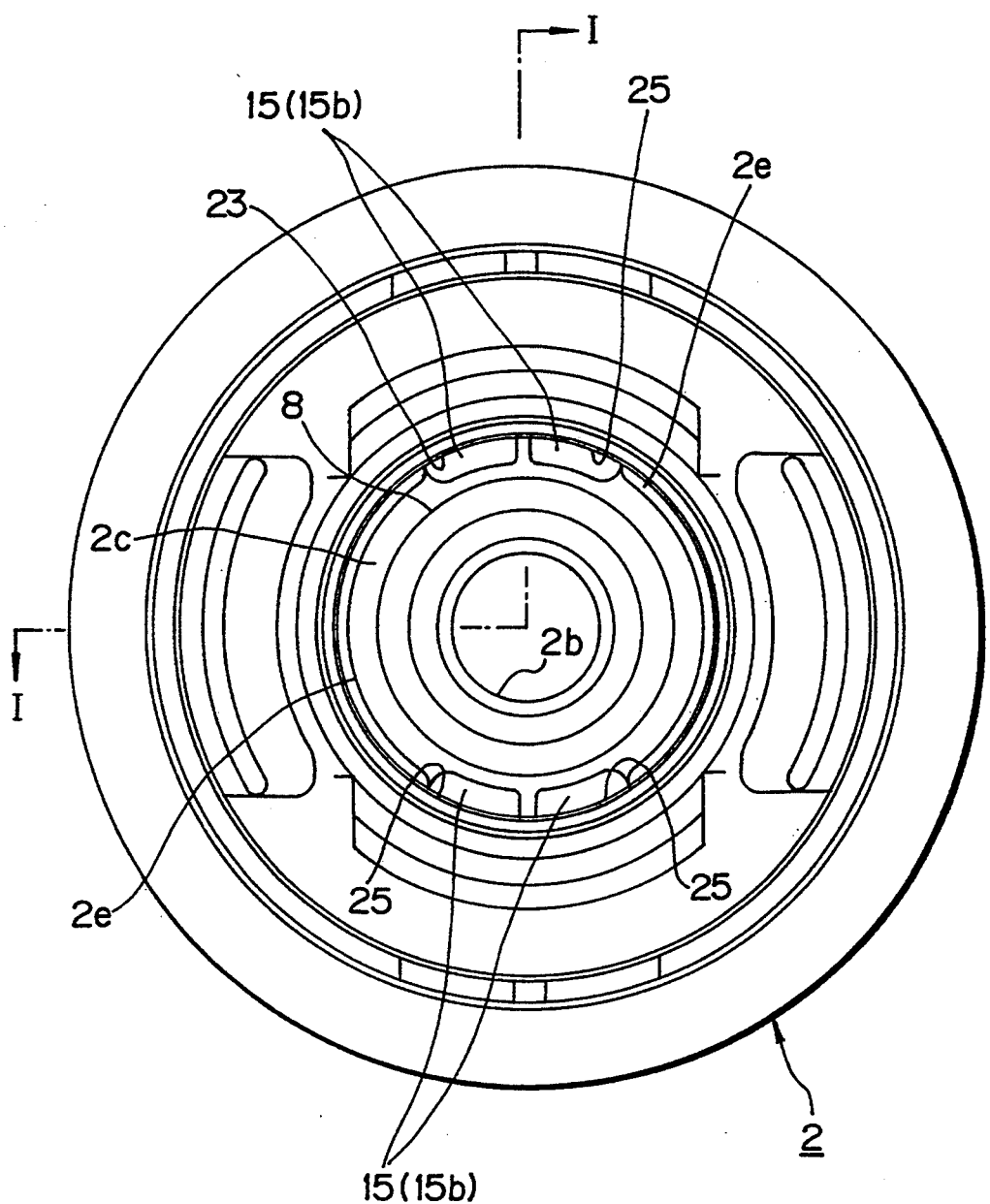
FIG. 2 is a right-hand side elevation of a valve body shown in FIG. 1.

Referring to the drawings, several embodiments of the invention will now be described, FIG. 1 shows essential parts of a brake booster of tandem type. Specifically, a shell 1 houses a substantially tubular valve body 2 which is formed of synthetic resin and which is slidably disposed therein. Toward its rear end, the valve body 2 includes a tubular portion 2a which projects to the exterior through an opening 1a formed in the shell 1. A pair of power pistons 3 are mounted around the external periphery of the valve body 2, and a diaphragm 4 is applied to the back surface of each power piston 3, thus defining a constant pressure chamber A and a variable pressure chamber B across the power piston 3. A valve mechanism 5, which is known in itself, is received within the tubular portion 2a of the valve body, and serves switching a fluid circuit between the constant pressure chamber A, the variable pressure chamber B and the atmosphere.

The valve mechanism comprises a valve plunger 6 slidably fitted into a bore 2b of a reduced diameter formed in the valve body 2, an annular, first valve seat 7 formed at the rear end of the valve plunger 6, an annular, second valve seat 8 formed on the valve body 2 in surrounding relationship with the first valve seat 7, and a valve element 10 which is adapted to be seated upon either valve seat 7 or 8 from the rear side, as viewed in FIG. 1, under the resilience of a first coiled spring 9. The second valve seat 8 is formed by an internal peripheral edge of an end face of an annular, first step 2c formed on the internal peripheral surface of the tubular portion 2a. The rear end of the valve plunger 6 is connected to an input shaft 11, which is in turn operated by a brake pedal, not shown. The valve mechanism 5 is operated in response to an actuation of the input shaft 11.

The valve body 2 is formed with a constant pressure passage 15 extending parallel to the axis of the valve body. The front end 15a of the passage 15 opens into the end face 2d of a step of the valve body 2 which communicates with the forwardly disposed, constant pressure chamber A. An intermediate portion of the constant pressure passage 15 which is directed radially outward opens into the rearwardly disposed, constant pressure chamber A. The rear end 15b of the passage 15 opens across the end face of the first step 2c which is located outward of the second valve seat 8 and its adjacent rear portion.

A space disposed radially inward of the engagement between the second valve seat 8 and the valve element 10, but is radially outward of the engagement between the first valve seat 7 and the valve element 10 communicates with the variable pressure chamber B through a radially extending variable pressure passage 16 which is formed in the valve body 2.

A space disposed radially inward of the engagement between the first valve seat 7 and the valve element 10 communicates with the atmosphere through a pressure passage 17 defined by a clearance between the internal peripheral surface of the tubular portion 2a of the valve body 2 and the external peripheral surface of the input shaft 11 and through a filter 18 disposed to cover the pressure passage 17.

The valve element 10 is generally tubular in configuration and has an annular front end, which defines a seat adapted to be seated upon either valve seat 7 or 8. The rear end of the valve element 10 is formed as a bead 10a having an increased thickness. The bead 10a has an inner diameter greater than that of the first step 2c, and abuts against an annular, second step 2e, which is formed rearward of the first step 2c, from the rear side. Under this condition, an annular retainer 19 is disposed in abutment against the bead 10a from the rear side to mount the bead 10a in place around the internal peripheral surface of the tubular portion 2a.

In the present embodiment, the first coiled spring 9 is disposed between the internal peripheral edge of the retainer 19 and the back surface of the seat of the valve element 10 while a second coiled spring 20 is disposed between the retainer 19 and the input shaft 11. The second coiled spring 20 has a greater resilience than the first spring 9, whereby the second spring 20 is effective to return the input shaft 11 to its inoperative position.

The front end of the valve plunger 6 is disposed in opposing relationship with a reaction disc 21, which is received in a recess 22a formed in one end of an output shaft 22 and which abuts against the front end face of an annular projection 2d' extending from the axial portion of the end face 2d of the step.

The front end 15a of the constant pressure passage 15 opens at a location adjacent to, but outward of the annular projection 2d'. During the manufacture of the valve body 2, the constant pressure passage is formed in the manner illustrated in FIG. 3. Specifically, a first releasable mold 23 is withdrawn in the forward direction from the position of the end face 2d of the step to define a first axial peripheral surface 2f which extends parallel to the axis of the valve body 2, and a second releasable mold 24 is withdrawn in the rearward direction from the position of the first step 2c to define a second axial peripheral surface 2g which extends parallel to the axis of the valve body 2.

When disposing the both releasable molds 23, 24, they are disposed so that a rear portion of the inner surface 23a of the first releasable mold 23 and a forward portion of the outer surface 24a of the second releasable mold 24 overlap axially and contact each other, so that when the both molds 23, 24 are withdrawn, the first and the second axial peripheral surface 2f, 2g communicate each other, thereby defining the constant pressure passage 15 which generally extends parallel to the axis of the valve body 2. Since the second axial peripheral surface 2g is located radially inward of the first axial peripheral surface 2f, a step 2h is formed at the boundary therebetween.

The described construction substantially remains the same as a conventional brake booster.

In accordance with the present embodiment, a notch 25 which extends to the end face of the second step 2e is formed in the internal peripheral surface of the tubular portion 2a which is located rearward of the rear end 15b of the constant pressure passage 15. When the notch 25 is formed, the end face of the second step 2e will be discontinuous in the circumferential direction. Accordingly, a ring-shaped member 26 is disposed against the end face from the rear side so as to match the height of the step. The bead 10a of the valve element 10 is disposed in abutment against the ring-shaped member 26 from the rear side, and finally the retainer 19 is used to fix the assembly in place.

In this manner, the outer diameter of the reaction disc 21 can be increased without accompanying an increase in the size of the valve body 2.

Figure 3:
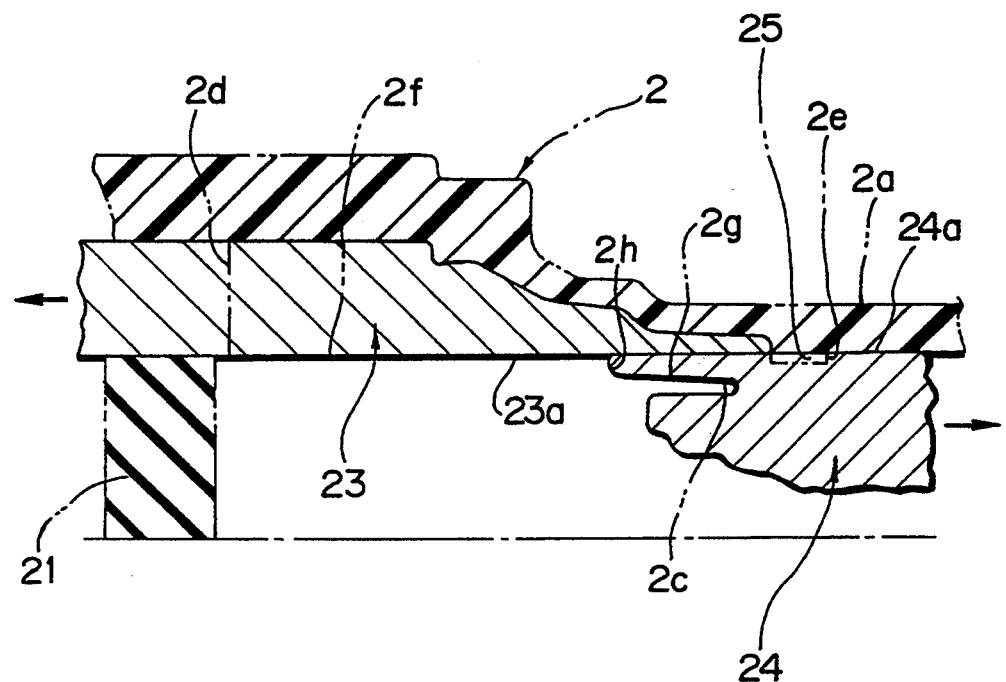
FIG. 3 is an illustration of layout of releasable molds used when forming a constant pressure passage shown in FIG. 1.

Specifically, referring FIG. 3, it will be seen that when forming the constant pressure passage 15 so as to extend parallel to the axis of the valve body 2, it is necessary that a rear portion of the inner surface 23a of the first releasable mold 23 and a front portion of the outer surface 24a of the second releasable mold 24 be disposed in contact with each other. For this reason, with the conventional arrangement which is devoid of the notch 25, the outer surface 24a of the second releasable mold 24 had to be positioned radially inward of the inner peripheral edge of the second step 2e. This requires that the first releasable mold 23 be also positioned radially inward by an amount corresponding to the height of the second step 2e, which imposed a restriction upon a possible maximum value for the outer diameter of the reaction disc 21.

By contrast, in the present embodiment, the provision of the notch 25 allows the outer surface 24a of the second releasable mold 24 to be located radially outward by an amount corresponding to the depth of the notch 25 or the height of the second step 2e. This in turn allows the first releasable mold 23 to be located radially outward by an amount corresponding to the depth of the notch 25, thus allowing the diameter of the reaction disc 21 to be increased by an amount corresponding to the depth of the notch 25. An increase in the outer diameter of the reaction disc results in a reduced internal pressure within the reaction disc 21, allowing the durability of the reaction disc 21 to be improved over the prior art.

The provision of the notch 25 is also effective to increase the strength of the portion of the second releasable mold 24 which is used to form the second axial peripheral surface 2g, thereby allowing the depth of the second axial peripheral surface 2g to be increased than in the prior art to thereby increase the channel area of the constant pressure passage 25.

Figure 4:
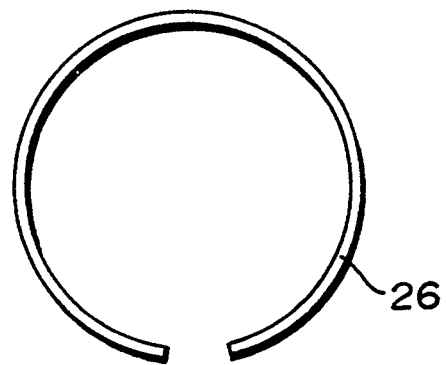
FIG. 4 is a front view of another embodiment of a ring-shaped member.

The ring-shaped member 26 which is disposed in abutment against the second step 2e of the valve body 2 need not be continuous in the circumferential direction, but may be arcuate as shown in FIG. 4.

While the ring-shaped member 26 is disposed in abutment against the end face of the second step 2e from the rear side and the bead 10a of the valve element 10 is in turn disposed in abutment against the rear side of the ring-shaped member in the described embodiment, the ring-shaped member 26 may be integrally staked to the front side of the bead 10a during the manufacture of the valve element 10.

As a modification, a plurality of ribs may be formed on the end face of the step in the area of the notch 25 when the notch 25 is formed to extend to the end face of the second step 2e. In such instance, the ring-shaped member 26 may be omitted.

While the invention has been shown and described above in connection with preferred embodiments thereof, it should be understood that a number of changes, modifications and substitutions therein will readily occur to one skilled in the art from the above disclosure without departing from the spirit and scope of the invention defined by the appended claims.

What is claimed is:

1. A booster comprising a substantially tubular valve body, an annular, first step on the internal peripheral surface of the valve body with its end face facing rearward, an annular, second step on the internal periphery of the valve body at a position rearward of the first step, with an end face of the second step facing rearward, an annular valve seat on the inner periphery of the end face of the first step, a constant pressure passage within the valve body and having a rear end which opens into the internal peripheral surface of the valve body at a location radially outward of the valve seat, and a substantially hollow cylindrical valve element having a front end which defines a seat adapted to be seated upon the valve seat and having a rear end which is mounted on the second step;

characterized as having a notch disposed in the internal peripheral surface of the valve body at a location rearward of the constant pressure passage, said notch extending from the rear end of the constant pressure passage to the end face of the second step and having a depth which is equal to the height of the second step, a ring-shaped member disposed in abutment against the end face of the second step, and said rear end of said valve element disposed in abutment against the ring-shaped member from the rear side thereof and having an increased thickness relative to the front end thereof, said ring-shaped member and said rear end of said valve element being secured in place against the second step by a substantially hollow cylindrical retainer.

2. A booster according to claim 1 in which the ring-shaped member is arcuate in configuration.

3. A booster according to claim 1 in which the ring-shaped member is integrally staked to the rear end of the valve element.

4. A booster according to claim 1 in which the end face of the second step is formed with a plurality of ribs in the region of the notch.

* * * * *